United States Patent [19]
Loyd, Jr.

[11] 3,957,021
[45] May 18, 1976

[54] PRECOMBUSTION CHAMBER ROTARY PISTON DIESEL ENGINE

[75] Inventor: Robert W. Loyd, Jr., Wyckoff, N.J.

[73] Assignee: Curtiss-Wright Corporation, Wood-Ridge, N.J.

[22] Filed: Oct. 15, 1974

[21] Appl. No.: 514,447

[52] U.S. Cl. .............................. 123/8.11; 123/32 C
[51] Int. Cl.² .......................................... F02B 53/02
[58] Field of Search................ 123/8.09, 8.11, 8.13, 123/32 C, 32 D, 32 ST, 32 SP, 33 B, 33 C, 27 R

[56] References Cited
UNITED STATES PATENTS

| | | | |
|---|---|---|---|
| 3,216,404 | 11/1965 | Peras .................................... | 123/8.45 |
| 3,650,261 | 3/1972 | Hutsell ........................... | 123/32 J X |
| 3,805,747 | 4/1974 | Nakagawa et al. ................ | 123/8.13 |

FOREIGN PATENTS OR APPLICATIONS

| | | | |
|---|---|---|---|
| 995,101 | 6/1965 | United Kingdom................ | 123/8.11 |

*Primary Examiner*—Carlton R. Croyle
*Assistant Examiner*—Michael Koczo, Jr.
*Attorney, Agent, or Firm*—Arthur Frederick; Victor D. Behn

[57] ABSTRACT

The system and method of this invention is directed to effecting combustion of fuel in a rotary piston, internal combustion engine having a housing defining a trochoidal-shaped, multi-lobe cavity in which a rotor is mounted for planetary rotation and defines with the housing working chambers that successively expand and contract in volumetric size as the rotor orbits within the housing cavity. The system and method comprises a precombustion chamber which communicates with successive working chambers through an outlet port. When the outlet port is open to the working chamber at approximately the initiation of the expansion cycle of the working chamber, all the fuel for a particular engine operating condition of speed and load is mixed in the precombustion chamber with a relatively small quantity of air at a pressure substantially greater than the pressure in the working chamber to thereby cause ignition and flash of the fuel into the working chamber. Complete combustion of the fuel rich mixture flashed into the working chamber is supported by the air compressed in the working chambers.

13 Claims, 4 Drawing Figures

PRECOMBUSTION CHAMBER ROTARY PISTON DIESEL ENGINE

This invention relates to rotary piston, internal combustion engines such as the type disclosed in the U.S. Pat. to Wankel et al No. 2,988,065. More specifically, the invention relates to a rotary piston engine having a pre-combustion chamber, as exemplified in the U.S. Pat. to Clawson, No. 3,508,530 but operating on the heat of compression principle (diesel).

BACKGROUND OF THE INVENTION

Heretofore, improved performance of rotary piston, internal combustion engines across the full range of operation conditions from idling speed to full throttle, has been sought by providing a prechamber or precombustion chamber in which fuel is ignited and flashed into the working chamber to ignite the main fuel charge therein. Such an engine is disclosed in the aforesaid U.S. Pat. to Clawson and the U.S. Pat. No. 3,053,238 to Meurer. Also, rotary piston internal combustion engines of the Wankel type operating on the diesel principle have been conceived as exemplified in the U.S. Pat. Nos. to Feller, 3,782,337, Peras, 3,216,404 and Hamada 3,270,719 and British Pat. No. 1,068,209 also to Feller. In these latter type engines relatively large quantities of air are required and therefore the overall size of the engine becomes relatively large. Also it has been found difficult in Wankel type rotary piston internal combustion engines operating as a diesel to develop sufficient compression to ignite injected fuel. The present invention combines both concepts so as to achieve the advantages of precombustion and diesel operation without the attendant difficulty in achieving fuel ignition.

It is, therefore, an object of this invention to provide a fuel combustion system for a rotary piston, internal combustion engine operating on the heat of compression principle which requires compression of only a relatively small quantity of air to achieve fuel ignition.

It is another object of the present invention to provide in a rotary piston, internal combustion engine of the Wankel type an apparatus and method for more efficient combustion of fuel to minimize harmful constituents in exhaust emissions.

SUMMARY

This invention, therefore, contemplates an improved fuel combustion system and method for a Wankel type rotary piston, internal combustion engine having a housing defining a trochoidal shaped, multi-lobe cavity in which a piston or rotor is eccentrically mounted for rotation and which rotor forms with the housing working chambers that successively expand and contract in volumetric size as the rotor orbits within the housing cavity. The fuel combustion system comprises a precombustion chamber adjacent the housing cavity and in communication through an outlet port with a working chamber when the rotor is at or about its top center position. A fuel injector is disposed to inject a combustible fuel into the precombustion chamber while air for combustion is provided, from a suitable source thereof, e.g., a compressor, at a pressure substantially above the pressure in the working chamber. The air is introduced into the precombustion chamber through a valve controlled port. The remainder of the air necessary for complete combustion of the fuel in the working chamber is introduced into the working chambers through the usual intake port when each of the working chambers is passing through its intake or suction phase of operation. It is contemplated that the precombustion chamber be sized to be between about 1/20th and about 1/40th of the volume of the rotor displacement. It is also desired that the compression ratio of the engine be established between about 9 to 1 and about 10 to 1, not including the precombustion chamber.

The method of effecting fuel combustion according to this invention is to introduce high pressure air, e.g., at about 15 atmospheres of pressure, from a suitable source thereof into the precombustion chamber at about a time shortly before the apex portion of the rotor passes the outlet port of the precombustion chamber (at about top center position of the rotor or when the preceding working chamber is in the exhaust phase of operation). After the air is introduced into the precombustion chamber, the total fuel requirement for a particular engine operating condition is injected into the precombustion chamber. The entry of the fuel into mixture with the high pressure and high temperature air causes combustion of the fuel which then flashes into the working chamber via the outlet port. This rich mixture of burning fuel and air continues to burn in the working chamber into which it flashes with such combustion being supported by the compressed air in the working chamber.

For engine start-up purposes, a glow plug may be provided in the precombustion chamber until the chamber walls are heated sufficiently to insure autoignition of the fuel.

BRIEF DESCRIPTION OF THE DRAWINGS

The invention will be more fully understood from the following detailed description thereof when considered in conjunction with the accompanying drawing wherein one embodiment of the invention is illustrated by way of example and in which.

DESCRIPTION OF THE PREFERRED EMBODIMENT

Figure 1:
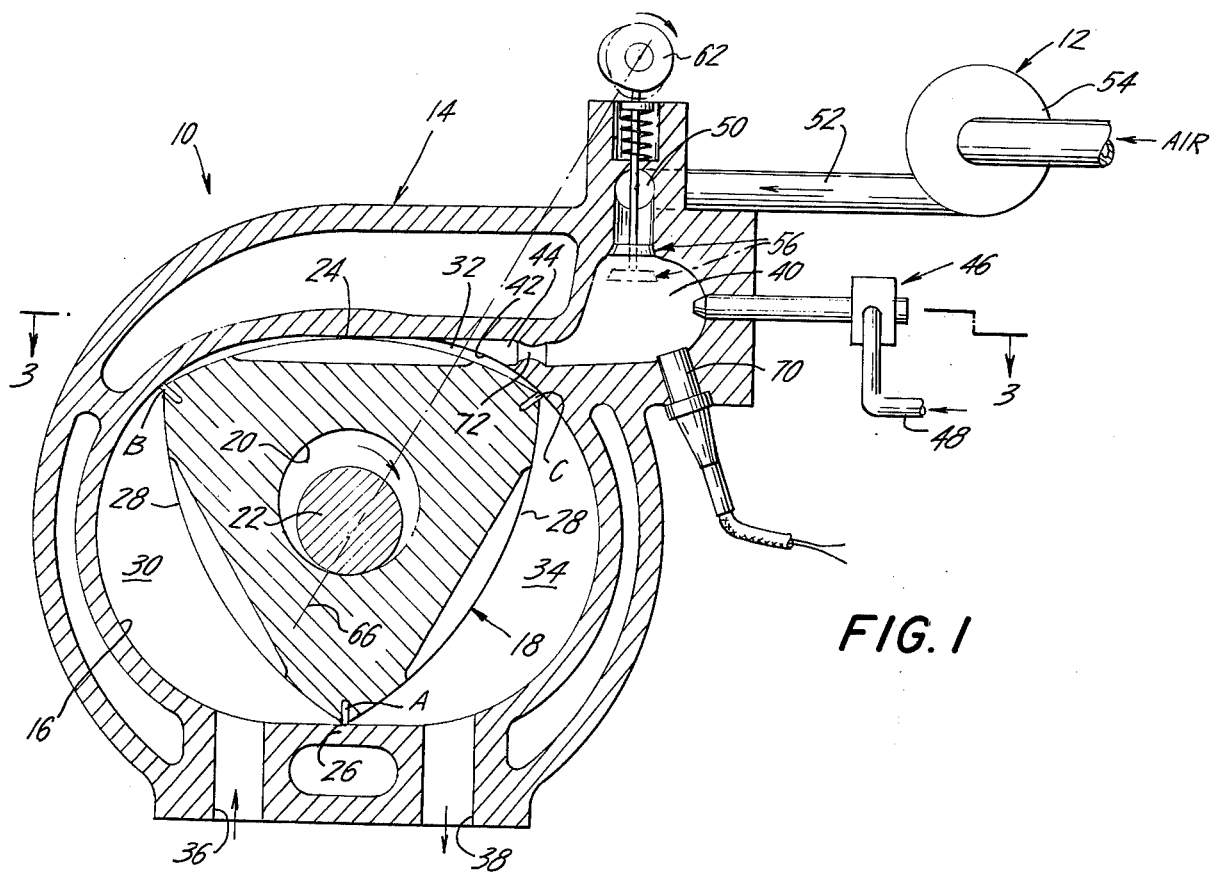
FIG. 1 is a schematic transverse cross-sectional view of a rotary piston, internal combustion engine having the combustion system according to this invention.

Now referring to the drawings and more specifically FIG. 1, the reference number 10 generally designates a rotary piston, internal combustion engine of the Wankel type, such as disclosed in the U.S. Pat. to Wankel et al, No. 2,988,065, which is provided with a fuel combustion system 12 according to this invention.

The rotary piston, internal combustion engine 10 comprises a housing 14 defining a cavity 16 of a trochoidal, multi-lobe configuration and having a rotary piston or rotor 18 mounted for rotation on an eccentric portion 20 of a driveshaft 22. The housing 14, as shown, may have a two-lobe cavity meeting at lobe junctures 24 and 26. A generally triangular-shaped rotor having three flank portions 28 meeting at apex portions A, B and C may be disposed in housing 14. The rotor 18 and housing 14, as shown, define therebetween three working chambers 30, 32 and 34 each of which successively expand and contract in volumetric size as rotor 18 orbits within cavity 16. An intake port 36 is provided in housing 14 to pass air into each working chamber 30, 32 and 34 as the rotor passes through the suction or intake phase of operation of the well known Otto 4-cycle engine operation of intake, compression, expansion or power and exhaust phases. While the intake port 36 is shown as a peripheral port, it may be a side port without departure from the scope and spirit of this invention. An exhaust port 38 is also provided in housing 14 to successively pass products of combustion from each of working chambers 30, 32 and 34 during the exhaust phase of operation of rotor 18. To provide for combustion of fuel in engine 10, fuel combustion system 12 of this invention is incorporated in the engine. The rotor and housing are sized to establish a compression ratio of between about 9 to 1 and about 10 to 1.

The fuel combustion system 12, in general, comprises a precombustion chamber 40, a fuel injector 46 for passing fuel into precombustion chamber 40, a source of high pressure air, such as a supercharger and/or a compressor 54, for introducing such air into precombustion chamber 40 to ignite the fuel, and a valve means 56 for coordinating high pressure air flow into the precombustion chamber to the angular position of rotor 18.

The precombustion chamber 40 is remote from housing cavity 16 but is located adjacent the working chambers and may be formed in housing 14 or in a device near or mounted on the housing 14. The precombustion chamber 40 may be generally spherical in shape and of a size between 1/20th and about 1/40th of the rotor displacement. To withstand the high temperatures generated by combustion in the precombustion chamber, it is contemplated that such chamber be constructed of or lined with high heat resistant material. An outlet port 42, including a passageway 44 is provided to communicate precombustion chamber 40 with successive working chambers 30, 32 and 34 as rotor 18 rotates. As shown, outlet port 42 is located about 30° of rotor movement passed lobe junction 24 adjacent the top center position of the rotor so that precombustion chamber 40 comes into communication with the working chambers; e.g., working chamber 32, when they are approximately in the initial stage of their respective expansion phases of operation.

The fuel injector or nozzle 46 is connected, through a supply pipe 48, with a source of pressurized fuel (not shown), such as a fuel pump (not shown), and is disposed to inject fuel into precombustion chamber 40.

The compressor 54 is connected by way of a passageway 50, including a pipe 52, to precombustion chamber 40 to conduct pressurized air to the latter. The compressor 54 is sized to deliver a relatively small quantity of air at a relatively high pressure; e.g., 15 atmospheres of pressure or more and substantially higher than the maximum pressure of the compressed air in the working chambers. The introduction of this high pressure, high temperature air into precombustion chamber 40, which is heated by reason of compression and further heated by the walls of precombustion chamber 40, is controlled by valve 56 which may be of any suitable type such as the cam actuated poppet type shown in the drawing. The compressor 54, as other auxiliary devices, may be driven, through suitable means, by driveshaft 22 or by exhaust gases as in the case of a turbo-supercharger.

Figure 4:
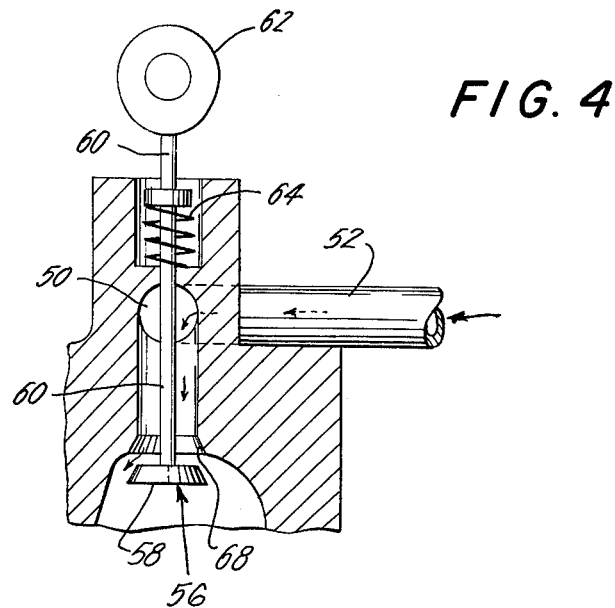
FIG. 4 is a fragmentary view in cross-section of the valve means for controlling high pressure air flow into the precombustion chamber.
Figure 3:
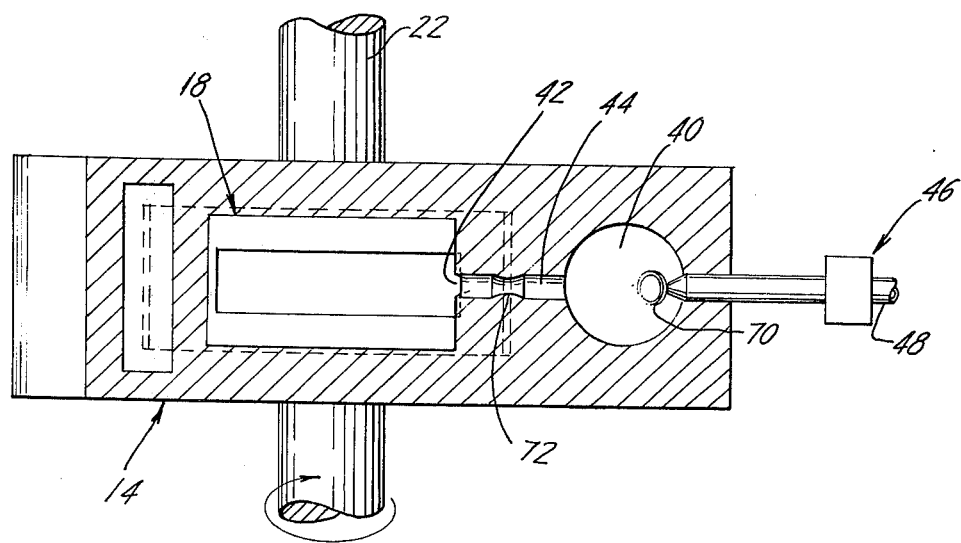
FIG. 3 is a view in cross-section taken substantially along line 3—3 of FIG. 1.

As best shown in FIG. 4, valve 56 may have a head portion 58 and a stem 60 which rides a camming surface of a cam 62. A spring 64 or other suitable biasing means is provided to maintain valve stem 60 in contact with cam 62. The actuation of valve 56 in relation to the angular positions of rotor 18 may be achieved by interconnecting cam 62 with the driveshaft 22 by suitable means such as a gear train, belt and pully system, chain and sprocket system or the like, as indicated schematically by the dot-dash line 66 in FIGS. 1 and 2. The head portion 58 is dimensioned to engage a valve seat 68 (see FIG. 2) formed at the inlet to precombustion chamber 40.

Figure 2:
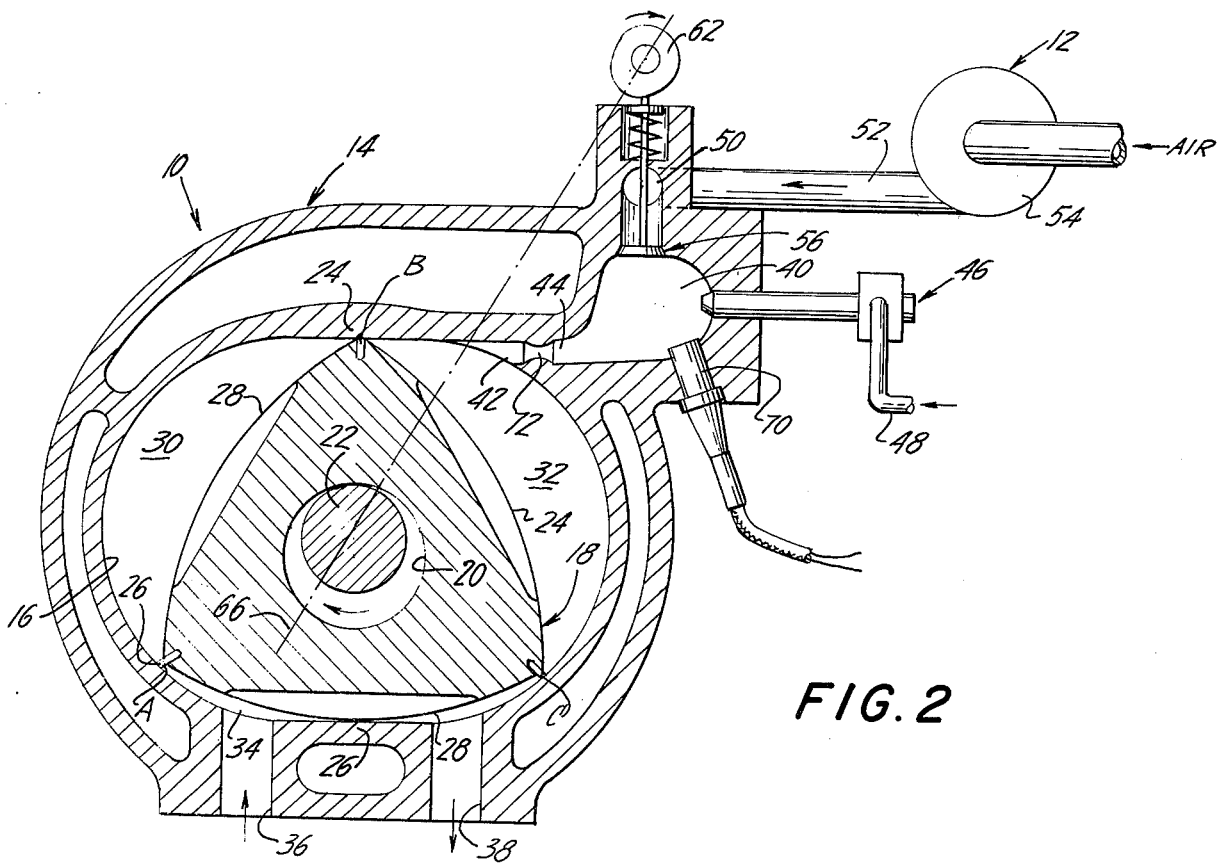
FIG. 2 is a cross-sectional view, similar to FIG. 1, showing another operative position.

To insure ignition of the fuel in precombustion chamber 40 in cold starts of the engine, an electrical ignition means, such as a glow plug 70 is provided (see FIGS. 1 and 2). When the walls of precombustion chamber 40 are heated sufficiently after a short operating period of time to insure combustion of fuel upon introduction of high pressure air, the glow plug may become inoperative.

A constriction 72 is provided in passageway 44 to accelerate the hot gases escaping from precombustion chamber 40 so that a jet of hot gases enters the working chambers 30, 32 and 34 at approximately sonic conditions. The constriction 72 also serves to minimize pressure losses from precombustion chamber 40 during entry of air and prior to fuel injection.

The method of operation of engine 10, according to this invention, comprises inducting only air through intake port 36 into the working chambers during their intake or suction cycle of operation. Thereafter, shortly before rotor 18 reaches its top center position as shown in FIG. 1 and before apex seal in apex portion C of the rotor passes outlet port 42, valve 56 is actuated by cam 62 to an open or unseated position to allow high pressure, high temperature air to flow into precombustion chamber 40. This initial surge of air into precombustion chamber 40 functions to purge the precombustion chamber of products of combustion from a previous cycle of operation by blowing such products through outlet port 42 into working chamber 34 which at that time is in the latter stage of an expansion phase of operation. The valve 56 is timed to admit a relatively small quantity of high pressure air; e.g., at 15 atmospheres or more, into the precombustion chamber, losses through the outlet port 52 being minimized by constriction 72. After valve 56 is closed, fuel is injected through injector 46 into precombustion chamber 40 and into mixture with the high pressure, high temperature air. The quantity of fuel injected is the total required to effect operation of the engine at a particular speed and load and, in relation to the amount of air, results in a fuel rich mixture of fuel and air. The entry of fuel into mixture with the air results in auto-ignition of the fuel and with outlet port 42 open to working chamber 32, the ignited fuel flashes, through passageway 44 and outlet port 42 into working chamber 32 (see FIG. 1). This fuel rich mixture of only partially burning fuel is completely burned in working chamber 32, which combustion is supported by the compressed air in working chamber 32. The combustion gases expand and in so doing rotatively drive rotor 18 (see FIG. 2). When the apex portion C of rotor 18 is carried sufficiently to bring exhaust port 38 into communication with working chamber 32, the products of combustion are discharged from the working chamber upon further rotation of rotor 18. This process is repeated for each of the other two working chambers 30 and 34 for each revolution of rotor 18.

For cold stating of the engine where the cold wall surfaces of precombustion chamber 40 chills the fuel-air mixture to prevent ignition of the fuel when valve 56 opens to admit air into the precombustion chamber, glow plug 70 is charged so as to insure ignition of the fuel.

It is believed now readily apparent that the present invention provides for a rotary internal combustion engine of the Wankel type with an improved fuel combustion system which provides substantially complete combustion efficiently and cheaply.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotary internal combustion engine of the diesel type having a housing defining a trochoidal, two-lobe cavity in which a rotor, having three contiguous flank portions and pockets in each such flank portion, is eccentrically mounted for rotation and which defines with the housing a plurality of working chambers that successively expand and contract in volumetric size as the rotor and housing rotate relative to each other, a fuel combustion system comprising:
   a. an air intake port in the housing communicating with a working chamber during its expansion cycle of operation for passing only air into the working chambers for compression of such air;
   b. an exhaust port in the housing communicating with a working chamber during its exhaust cycle of operation for expelling spent products of combustion from the working chambers;
   c. a precombustion chamber adjacent said working chambers;
   d. outlet port means in the housing for communicating the precombustion chamber with the working chambers at a point angularly spaced in the direction of rotor rotation a relatively small distance past the lobe junction of the housing cavity remote from said air intake port;
   e. means for injecting all of the fuel required for a particular engine operating speed and load into the precombustion chamber;
   f. a source of compressed air having a pressure substantially greater than the maximum pressure of the compressed air in the working chamber at full compression and having a heat of compression sufficient to effect spontaneous ignition of the fuel injected by said means;
   g. passageway means communicating said source of compressed air with the precombustion chamber to pass such compressed air into the precombustion chamber and into admixture with the fuel to effect thereby ignition of the fuel injected by said fuel injection means into the precombustion chamber; and
   h. valve means for controlling compressed air flow from the passageway means into the precombustion chamber in relation to rotor rotation so that the ignited fuel flashes from the precombustion chamber through the outlet means when the rotor is in a preselected angular position.

2. The apparatus of claim 1 wherein the outlet port means is located at about 30° past the top center of the rotor and the lobe juncture.

3. The apparatus of claim 1 wherein said source of compressed air is a compressor.

4. The apparatus of claim 3 wherein said compressor is capable of producing air at 15 atmospheres of pressure.

5. The apparatus of claim 1 wherein said valve means is a cam controlled poppet valve.

6. The apparatus of claim 1 wherein a glow plug is provided in the precombustion chamber to ignite the fuel during cold engine starts.

7. The apparatus of claim 1 wherein said rotor and housing are sized to provide a compression ratio of between about 9 to 1 and 10 to 1 exclusive of the precombustion chamber.

8. The apparatus of claim 1 wherein the precombustion chamber is dimensioned so as to be of a size between about 1/20th and about 1/40th of the volume of the rotor displacement.

9. The apparatus of claim 1 wherein said outlet port means includes a restricted passageway.

10. In a rotary internal combustion engine having a housing defining a trochoidal, two-lobe cavity in which a rotor having three contiguous flank portions and pockets in each of such flank portions, is eccentrically mounted for orbital movement so that a plurality of working chambers are defined by the rotor and housing which working chambers successively expand and contract in volumetric size as the rotor orbits within said cavity, the method of fuel combustion comprising the steps of:
   a. compressing only air in each of the working chambers during the compression phase of operation of the respective working chambers as the rotor rotates;
   b. introducing a relatively small quantity of air, at a pressure substantially higher than the compressed air pressure in the working chambers at full compression, into mixture with all of the fuel required for a particular engine operating speed and load in a prechamber outside of the working chambers to effect by the heat of compression ignition of the fuel;
   c. passing the ignited fuel from the prechamber into a working chamber after a relatively small angular distance of the rotor past top center; and
   d. exhausting the products of combustion from successive working chambers on the exhaust phase of operation and after the expansion phase of working chamber operation.

11. The method of claim 10 wherein the mixture of fuel and air is electrically ignited in cold starts of the engine.

12. The method of claim 10 wherein introduction of the high pressure air is controlled to effect mixture with the fuel in accordance with a predetermined angular position of the rotor.

13. The method of claim 12 wherein said predetermined angular position of the rotor is about top center.

* * * * *